United States Patent Office 2,800,025
Patented July 23, 1957

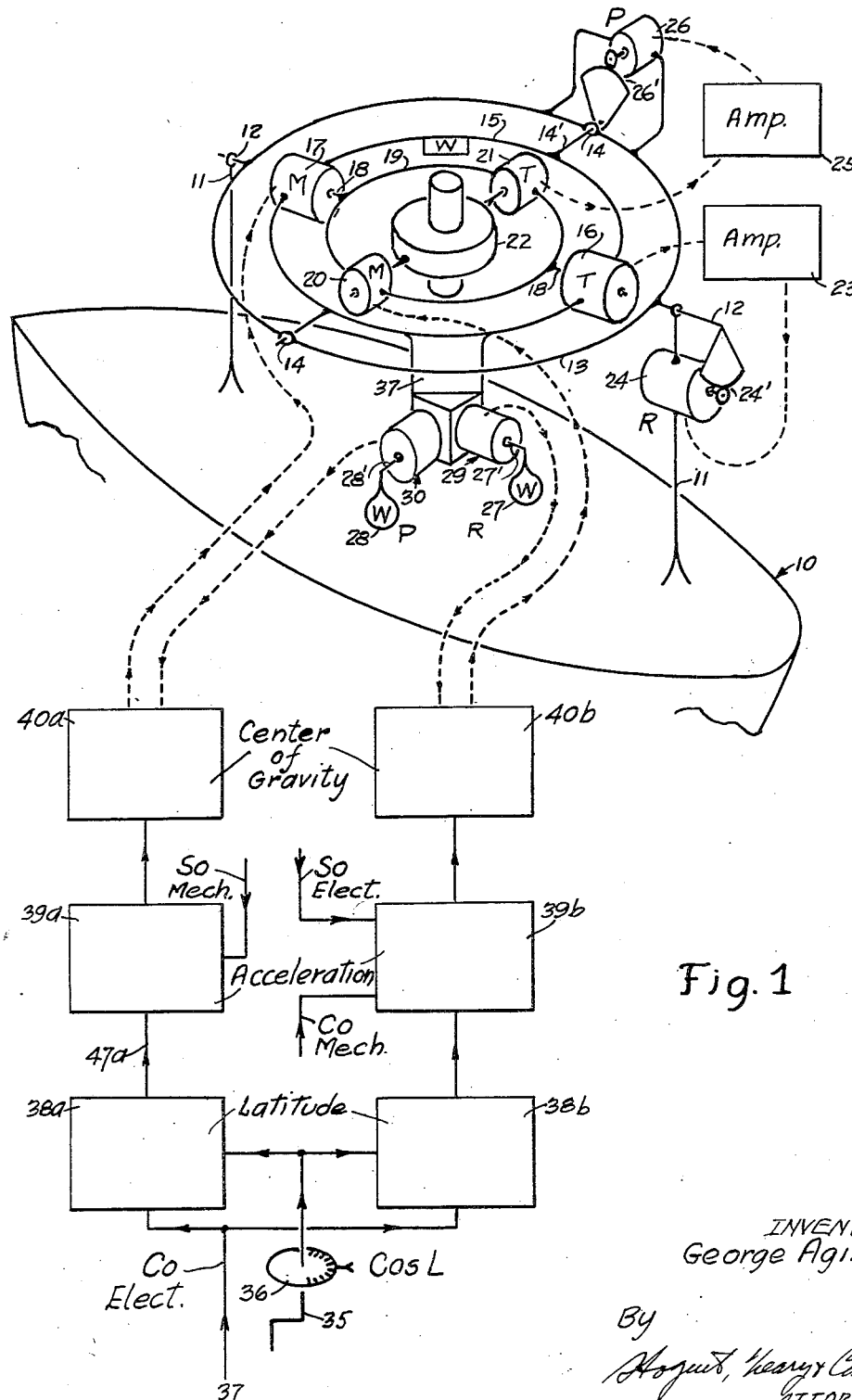

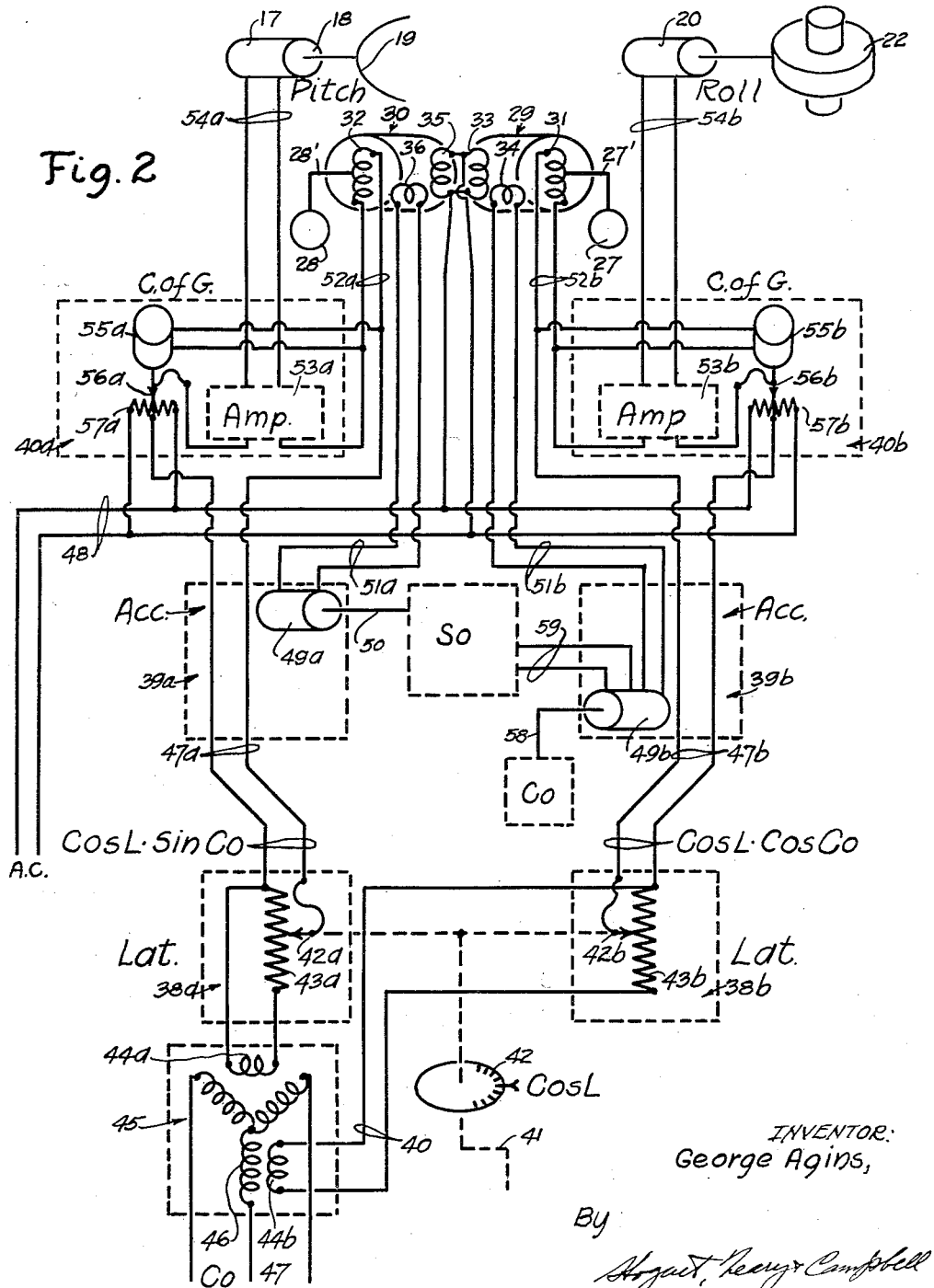

2,800,025
LEVELING APPARATUS

George Agins, Brooklyn, N. Y., assignor to American Bosch Arma Corporation

Application July 28, 1945, Serial No. 607,614

20 Claims. (Cl. 74—5.47)

This invention relates to leveling apparatus and has particular reference to an accurate stable vertical for use in naval gun fire control or the like.

In modern naval battles the evasive maneuvering of warships for reasons of safety render present gyroscopic vertical indicators inaccurate, especially where mercury is used for erecting the gyroscope, because, due to accelerations, a false vertical is caused by the mercury and no practical means of compensation for this error has been found. Instead, it has been the practice to minimize the disturbing acceleration effects of the mercury control during rapid changes in course and speed by disabling the control such as by plugging the mercury flow passage, but that expedient is obviously only a makeshift and impractical for maneuvering ships because the maneuvers may be long-continued, thus permitting the gyroscope to become derelict, due to lack of control of its wandering tendency for long periods of time.

It has also long been the custom, when using a stable vertical indication for power correction of instruments on an unstable mount, to provide a free gyroscope with a correcting means adapted to quickly precess it back to the vertical, upon any deviation therefrom. Such a free gyroscope, being sensitive to the slightest torque is, of course, quite unable to create powerful corrective impulses without itself deviating widely from the vertical. Consequently a phantom member is usually arranged to accurately follow-up the motions of the gyroscope relative to the unstable mount and to transmit these motions as required for instrument stabilization. In other words, the gyroscope is kept substantially vertical and its position repeated by a phantom, which is therefore also vertical.

In accordance with the present invention, a theoretically accurate vertical indication is automatically obtained by level apparatus including a phantom follow-up mechanism having means for calculating continuously the forces tending to cause error and applying corrective values simultaneously, the apparatus operating without any interruption at any time, and without the use of mercury, with all its attendant troubles.

The invention utilizes a gyroscope phantom follow-up mechanism in which the free gyroscope is precessed, not fundamentally to keep the gyroscope vertical but to keep the phantom vertical, the exact position of the gyroscope being subordinate to the position of the phantom follow-up member whose deviation is measured from the vertical and the gyroscope precessed in order to indirectly correct deviations of the phantom, instead of measuring deviation of the gyroscope and then correcting the gyroscope as in previous systems.

In a preferred embodiment of the invention, the gyroscope is freely suspended in gimbal rings on the unstable support, such as a ship deck, and one of the gimbal rings serves as the phantom member and which is continually restored to level position by torque motors acting on the gyroscope about its coordinate suspension axes to precess it through an angle equal to its deviation as detected by small auxiliary fore-and-aft and athwartships pendulums accordingly actuating voltage generators feeding said torque motors, after certain corrections are introduced by calculating mechanism, and also controlling the roll and pitch stabilizing mechanism connected to the gimbal system. The corrections imposed upon the phantom or follow-up member are those due to changes in ship's course and acceleration, latitude, gyroscope center of gravity, and the like.

It will be seen that the level apparatus of this invention, by precessing the gyroscope to keep a phantom member level, enables use of sufficient power to effect the required corrections without imposing disturbing loads on the gyroscope, and that the difficulties attending the usual mercury ballistic erecting systems are avoided by use of the small auxiliary pendulums, whereby a greatly simplified and more accurate and reliable level apparatus is provided for the more rigorous operating conditions, as well as ordinary operations.

For a more complete understanding of the invention, reference may be had to the accompanying drawings, in which:

Figure 1 is a schematic diagram of the level apparatus of this invention; and

Fig. 2 is a wiring diagram of the correcting system thereof.

Referring to Fig. 1 of the drawings, numeral 10 designates the deck of a ship, aircraft, tank, or other unstable support on which are fixed in a fore-and-aft plane a pair of stanchions 11, on which is pivoted on horizontal trunnions 12 a gimbal ring 13 having bearings 14 arranged athwartships and in which is pivoted a second gimbal ring 15. Carried by ring 15, in the fore-and-aft axial plane, are servomotors 16 and 17 whose shafts 18 are the trunnions of inner gimbal ring 19, which in turn carries servomotors 20 and 21 having their axles arranged in the athwartships axial plane and serving as trunnions for the small vertical axis gyroscope 22.

The structure of units 16, 17, 20 and 21 is substantially identical to that of a conventional synchronous generator or motor, well known to the art and hence need not be further described. Thus, the units 16, 17, 20 or 21 may also serve as alignment transmitters as well as torque motors, and inasmuch as each has a shaft supported in bearings, the shaft may serve the dual functions of the rotor shaft and the journal of the corresponding gimbal bearing. When the stator windings are energized from a suitable single-phase source, as is usual, the resulting pulsating field induces a voltage in the wound rotor which is proportional to the angle through which the rotor is turned relatively to the stator when the unit is serving as a transmitter, or a torque is imposed on the rotor when the unit is serving as torque motor.

Although each unit is adapted to perform the dual angle transmitter and torque motor functions described, it may be assumed for purposes of simplification that units "T" 16 and 21 are "null" transmitters and that respective "M" companion units 17 and 20 are torque motors. Transmitter 16 detects and generates a voltage proportional to roll error as the gyroscope-stabilized rotor armature thereof turns relatively to the stator carried by gimbal ring 15. This roll angle voltage value is transmitted by "null" transmitter 16 through a conventional electronic amplifier 23 to a follow-up motor 24 mounted on stanchion 11 and connected by gearing 24' to one trunnion 12 of the outer gimbal ring 13. Rotation of roll follow-up motor 24 causes gimbal ring 13 to turn through the roll angle detected by transmitter 16, thereby restoring the armature of the latter to non-inductive or null position so that motor 24 de-energizes itself when it has restored ring 13 to level position.

Similarly, transmitter 21 detects and generates a voltage proportional to pitch error as the gyroscope-stabilized rotor thereof is turned relatively to the stator carried by inner gimbal ring 19. This pitch angle voltage value is amplified by electronic amplifier 25 and impressed on pitch follow-up motor 26 carried by outer gimbal ring 13 and connected by gearing 26' to one trunnion 14' of gimbal ring 15. Rotation of motor 26 causes gimbal ring 15 to turn through the pitch angle and thus the rotor of transmitter 21 is restored to non-inductive position and pitch follow-up motor 26 accordingly de-energized. Accordingly, as seen in Fig. 1, gimbal ring 15, being pivoted athwartships in bearings 14, indicates pitch angle when properly operating, whereas gimbal ring 13, being pivoted fore-and-aft on trunnions 12, indicates roll angle when properly operating. The roll follow-up motor 24 and the pitch follow-up motor 26 operate together in the manner described to keep the gimbal ring 15 substantially in the same plane as that of the wheel of the gyroscope 22, with the center axis perpendicular to the plane of ring 15 substantially coincident with the vertical axis of gyroscope 22. It will be understood that the respective roll and pitch follow-up motors 24 and 26 may also operate self-synchronous transmitters (not shown) to transmit roll and pitch angle values to remote points for various uses.

In order to indicate the vertical for guidance of the gyroscope 22 in place of the usual mercury ballistic erecting system, two pendulums 27 and 28 are suspended from gimbal ring 15, the former being mounted on a fore-and-aft axis shaft 27' so as to be responsive to roll and the latter on an athwartship axis shaft 28' so as to be responsive to pitch. The pendulum shafts 27' and 28' are the shafts of respective electromechanical trigonometric angle resolvers 29 and 30 shown diagrammatically in Fig. 2 as consisting of rotor windings 31 and 32, connected to respective shafts 27' and 28', and space quadrature stator windings 33, 34 and 35, 36, respectively. The resolvers 29 and 30 are arranged to inductively generate a voltage proportional to a trigonometric function of the angle through which the rotors thereof are rotated by their respective pendulums 27 and 28, the radius of the angle being the input impressed on the stator windings and creating a field in which the rotors are turned. These resolvers 29 and 30 are supported on a balanced depending bracket 37 on the gimbal ring 15.

As shown in Fig. 1, all error measurement, and also compensation for errors, is limited to two mutually perpendicular planes, i. e., those of the gimbal axes 14, 14 and pendulum axis 28' for the pitch plane, and those of the gimbal axes 12, 12 and pendulum axis 27' for the roll plane. The errors are measured in these planes and calculated in mechanisms designated 38a, 38b, 39a, 39b, 40a and 40b in Figs. 1 and 2, and shown diagrammatically in Fig. 2. These correcting mechanisms cooperate with pendulums 27 and 28 and with gyroscope precession torque motors 20 and 17. As stated, torque motors 17 and 20 are comparable in construction and operation to a simple synchronous motor, whose rotor is urged towards alignment with the field of the stator, and as the shaft of the rotor of motor 17 is the trunnion 18 of gimbal ring 19, it creates a torque on the latter about the fore-and-aft or roll axis and precesses the gyroscope 21 in pitch. Similarly, motor 20 creates a torque about the gyroscope trunnions in the pitch plane and precesses the gyroscope accordingly, in roll.

As is well understood, there are several causes resulting in tilt of a gyroscope from the vertical to which it has been originally set, among which are, (1) rotation of the earth and travel of the gyroscope support; (2) friction in the bearings; (3) change in direction of apparent gravitation due to accelerations; (4) change in the center of gravity of the gyroscope due to heat or creeping of metal; and (5) magnetic fields, air currents, and the like. Causes designated (2) and (5) are readily corrected in well known ways, but the causes designated (1), (3) and (4) are not readily effectively overcome in conventional arrangements, and the present invention is concerned particularly with compensating for errors due to those causes. Of the correcting mechanisms shown in the drawings, those designated 38a and 38b are adapted to neutralize the tilt of the gyroscope due to the earth's rotation, i. e., the cause designated (1); mechanisms 39a and 39b are adapted to neutralize the effect of accelerations on the gyroscope, i. e., the cause designated (3), whereas mechanisms 40a and 40b compensate for the change in position of the center of gravity of the sensitive system 22, 19, 20, 21, i. e., the cause of error designated (4).

In the drawings, the calculator sections identified by the suffix "a" control precession in the pitch plane and those identified by the suffix "b" control precession in the roll plane. Obviously error may occur in any plane, and may be mathematically considered as being composed of errors in both the roll and pitch planes and acting in concert. Similarly, corrections may be applied in any given plane of tilt by actually applying appropriately proportioned corrections in these two chosen planes. Furthermore, since these two planes change their orientation with travel of the ship and, since the earth axis remains unchanged, the quantity "own ship's course" also enters into the calculations.

Referring to Fig. 2, with particular reference to correcting mechanism 38a and 38b for neutralizing the tilt of the gyroscope due to the earth's rotation, the inputs thereto are the cosine of the latitude angle L which is entered by the hand-crank 41 according to the latitude designation on the non-linearly graduated dial 42. Rotation of hand-crank 41 through the prescribed angle adjusts the brushes 42a and 42b of respective potentiometers 43a and 43b. Potentiometer 43a is energized by the voltage induced in secondary winding 44a and potentiometer 43b is energized by the voltage induced in secondary winding 44b of a Scott type transformer 45 whose primary winding is energized in accordance with own ship's course from a suitable source 47, such as a gyrocompass transmitter or repeater. Although a Scott type transformer is preferred, any other device for determining course angle with two components will be equally effective.

The voltage induced in secondary winding 44a of transformer 45, and accordingly impressed on potentiometer 43a, is proportional to the sine of the course angle or sin CO. Similarly, the voltage induced in secondary winding 44b of transformer 45 and consequently impressed on potentiometer 43b is proportional to the cosine of the course angle, or cos CO. The winding ratios of the transformer 45 are also such that the output voltages are proportional to the speed of the earth's rotation. The potentiometers 43a and 43b of correctors 38a and 38b, respectively, act as multipliers and hence the output of corrector 38a is proportional to $\cos L \cdot \sin CO$, whereas the output of corrector 38b is equal to $\cos L \cdot \cos CO$.

The voltage corresponding to $\cos L \cdot \sin CO$ is fed by wires 47a through mechanism 39a through pendulum rotor winding 32 of pitch resolver 30 in which an additional voltage is induced by the field jointly created by the alternating current impressed on stator winding 35 from source 48 and voltage from acceleration correcting mechanism 39a. This mechanism includes a generator 49a driven by a shaft 50 in accordance with change in own ship's speed, so that the voltage output thereof is proportional to own ship's acceleration. This output of correcting mechanism 39a is fed by wires 51a to the stator winding 36 of pitch resolver 30.

The voltage output of the pendulum rotor coil 32 is fed by wires 52a to correction mechanism 40a where after modification, it is amplified in a conventional electronic amplifier 53a and fed by wires 54a to torque motor 17 for creating a precessing torque about axis 18, 18 of gimbal ring 19, causing the gyroscope 22 to precess in a plane at right angles thereto in the pitch plane. The voltage so fed to pitch torque motor 17 is modified in accordance with change in the position of the center of gravity of the sensitve system 22, 19, 20 and 21. This change produces a gravity couple acting on the gyroscope 22 causing a slow precession in a certain direction. Sometimes, as in "near misses" in warfare, the center of gravity may shift temporarily and it is not desired to correct for this, which is momentary, but for a drift long continued, as one which might be due to change in temperature. For this purpose a very slow motor 55a connected to wires 52a, and hence energized by the pitch correction voltage from resolver 30, drives the brush 56a of a potentiometer 57a energized from alternating current source 48. One of the leads 47a is connected to the mid-tap of potentiometer 57a and its brush 56a is connected to one of the input terminals of amplifier 53a.

Accordingly, the input to amplifier 53a is modified by a voltage equal to a voltage which is a measure of the moment arm acting on the gyroscope, due to a shift in the center of gravity thereof. The voltage thus created is fed back into the correction line as shown to cause torque motor 17 to apply a counter-torque to the gyroscope to neutralize the effect of the shift in center of gravity. It is preferred that nothing less than a twenty-minute persistence of correcting voltage in one direction be able to produce an appreciable output from potentiometer 57a, so that transient disturbances will have no effect for the reasons stated. The input to amplifier 53a is only occasionally modified to correct for center of gravity changes and its output is preferably such as to render the action of pitch torque motor 17 non-linear. Since the correctors are all only voltage devices for affecting the grid of the amplifier, no appreciable current flows in coil 32 due to corrector 38a and therefore motor 55a will not receive current enough to operate against latitude correction as might be thought at first glance.

The other half or roll correction portion of the calculator is identical in construction and operation to the pitch control just described, with the exception of the acceleration corrector 39b. In corrector 39b the generator 49b is driven by a shaft 58 according to a mechanical input proportional to changes in own ship's course, CO, from a compass repeater, for example, and its field winding is energized by a voltage proportional to own ship's speed, SO, supplied by wires 59 from a suitable source driven by the propeller shaft, for example. Accordingly, the voltage output of generator 49b is proportional to radial acceleration on a turn of the ship. This voltage is impressed by wires 51b on the stator coil 34 of roll pendulum resolver 29 where it neutralizes the voltage induced in rotor coil 31 by reason of outward swing of the pendulum 27 in response to the turn. Thus any effect of the turn is neutralized before the response voltage thereof in resolver 29 is impressed on roll torque motor 20.

The parts of center of gravity correction mechanism 40b, viz., amplifier 53b, slow motor 55b and potentiometer 57b are identical in construction and operation to corresponding parts 53a, 55a and 57a of correcting mechanism 40a and need not be further described. The modified output of amplifier 53b is fed by wires 54b to roll torque motor 20 which creates a correcting torque on the trunnions of gyroscope 22 in the pitch plane, thus causing it to precess in the roll plane. In this way the gyroscope 22 is precessed in the roll and pitch planes in order to maintain the gimbal ring 15 level or horizontal, even though the exact vertical position of the gyroscope axis is impaired in so doing. However, the described follow-up of the ring 15 is not as sensitive as the gyroscope, and may be made to exert the power necessary to maintain its level position during the most violent and erratic maneuvers of the ship or other unstable support 10.

The operation of the stable apparatus of this invention has been described as a series of component operational steps. As a typical case for considering operation of the apparatus in its entirety, assume that the ship 10 is traveling rapidly, rolling and pitching and changing course and speed as it would in battle. The gyroscope 22 having previously brought ring 15 to a horizontal position, precesses through a small angle from the horizontal by reason of some external force, which results in follow-up of ring 15 by the action of null transmitters 16 and 21. As ring 15 tilts accordingly, its bracket 37 carrying pendulums 27 and 28 causes the latter to swing and analyze the deviation and generate compensating voltages energizing the torque motors 17 and 20 so that the gyroscope 22 is restored to horizontal. Inasmuch as pendulums 27 and 28 have a short oscillation period compared to that of the gyroscope 22 they respond quickly to disturbances and introduce appropriate corrections before gyroscope 22 deviates widely.

The aforementioned external force causing the deviation of the gyroscope 22, might be bearing friction for example, or caused by a magnetic or an unknown cause, but whatever the cause, the deviation is detected and promptly corrected by the pendulums, since the effect of latitude accelerations and change of gravity are continuously calculated and corrections applied by correctors 38a and 38b to 40a and 40b, inclusive.

Although a preferred embodiment of the invention has been illustrated and described herein, it is to be understood that the invention is not limited thereby, but is susceptible of changes in form and detail within the scope of the appended claims.

I claim:

1. A leveling apparatus adapted to be mounted on an unstable support, the combination of a gyroscope, a universal mount therefor fixedly oriented on said support, a follow-up member for said gyroscope having a predetermined position in space, motive means operatively connected to said gyroscope for precessing the same, a pendulum on said follow-up member responsive to deviation of said member from said position, operative connections between said pendulum and said motive means for inducing precession of said gyroscope to restore said follow-up member to said predetermined position, and means interposed in said connections for modifying the induced precession of said gyroscope by said motive means in accordance with a shift in the position of the center of gravity of said gyroscope.

2. A leveling apparatus adapted to be mounted on an unstable support, the combination of a gyroscope, a universal mount therefor fixedly oriented on said support, a follow-up member for said gyroscope having a predetermined position in space, follow-up mechanism responsive to relative movement between said gyroscope and said support for actuating said follow-up member to follow said gyroscope, motive means operatively connected to said gyroscope for precessing the same, a pendulum on said follow-up member responsive to deviation of said member from said position, operative connections between said pendulum and said motive means for inducing precession of said gyroscope to cause said follow-up mechanism to restore said follow-up member to said predetermined position, and means interposed in said connections for modifying the induced precession of said gyroscope by said motive means in accordance with a shift in the position of the center of gravity of said gyroscope.

3. A leveling apparatus adapted to be mounted on an unstable support, the combination of a gyroscope, a universal mount therefor fixedly oriented on said support, a follow-up member for said gyroscope having a predetermined position in space, motive means operatively connected to said gyroscope for precessing the same, a pendulum on said follow-up member responsive to deviation of said member from said position in a predetermined plane, operative connections between said pendulum and said motive means for inducing precession of said gyroscope in said predetermined plane to restore said follow-up member to said predetermined position, and means interposed in said connections for modifying the induced precession of said gyroscope by said motive means in accordance with a shift in the position of the center of gravity of said gyroscope.

4. A leveling apparatus adapted to be mounted on an unstable support, the combination of a gyroscope universally mounted on said support, a follow-up member therefor having a predetermined position in space, follow-up mechanism responsive to relative movement between said gyroscope and said support for actuating said follow-up member to follow said gyroscope, motive means operatively connected to said gyroscope for precessing the same, a pendulum on said follow-up member responsive to deviation of said member from said position in a predetermined vertical plane, operative connections between said pendulum and said motive means for inducing precession of said gyroscope in said predetermined plane to cause said follow-up mechanism to restore said follow-up member to said predetermined position, and means interposed in said connections for modifying the induced precession of said gyroscope by said motive means in accordance with a shift in the position of the center of gravity of said gyroscope.

5. A leveling apparatus adapted to be mounted on an unstable support, the combination of a gyroscope universally mounted on said support, a follow-up member therefor having a predetermined position in space, motive means operatively connected to said gyroscope for precessing the same in the roll plane of said support, a pendulum on said follow-up member responsive to deviation of said member from said position in the roll plane of said support, operative connections between said pendulum and said motive means for inducing precession of said gyroscope in the roll plane of said support to restore said follow-up member to said predetermined position, and means interposed in said connections for modifying the induced precession of said gyroscope by said motive means in accordance with a shift in the position of the center of gravity of said gyroscope.

6. A leveling apparatus adapted to be mounted on an unstable support, the combination of a gyroscope universally mounted on said support, a follow-up member therefor having a predetermined position in space, motive means operatively connected to said gyroscope for precessing the same in the pitch plane of said support, a pendulum on said follow-up member responsive to deviation of said member from said position in the pitch plane of said support, operative connections between said pendulum and said motive means for inducing precession of said gyroscope in the pitch plane of said support to restore said follow-up member to said predetermined position, and means interposed in said connections for modifying the induced precession of said gyroscope by said motive means in accordance with a shift in the position of the center of gravity of said gyroscope.

7. A leveling apparatus adapted to be mounted on an unstable support, the combination of a gyroscope universally mounted on said support, a follow-up member therefor having a predetermined position in space, motive means operatively connected to said gyroscope for precessing the same in the respective roll and pitch planes of said support, a pair of pendulums pivoted in the roll and pitch planes of said support on said follow-up member responsive to deviation of said member from said position in said respective roll and pitch planes, operative connections between said pendulums and said corresponding motive means for inducing precession of said gyroscope in the corresponding plane to restore said follow-up member to said predetermined position, and means interposed in said connections for modifying the induced precession of said gyroscope by said motive means in accordance with a shift in the position of the center of gravity of said gyroscope in said respective planes.

8. A leveling apparatus adapted to be mounted on an unstable support, the combination of a gyroscope universally mounted on said support, a follow-up member therefor having a predetermined position in space, follow-up mechanism responsive to relative movement between said gyroscope and said support for actuating said follow-up member to follow said gyroscope, motive means operatively connected to said gyroscope for precessing the same in the roll plane of said support, a pendulum on said follow-up member responsive to deviation of said member from said position in the roll plane of said support, operative connections between said pendulum and said motive means for inducing precession of said gyroscope in the roll plane of said support to cause said follow-up mechanism to restore said follow-up member to said predetermined position, and means interposed in said connections for modifying the induced precession of said gyroscope by said motive means in accordance with a shift in the position of the center of gravity of said gyroscope.

9. A leveling apparatus adapted to be mounted on an unstable support, the combination of a gyroscope universally mounted on said support, a follow-up member therefor having a predetermined position in space, follow-up mechanism responsive to relative movement between said gyroscope and said support for actuating said follow-up member to follow said gyroscope, motive means operatively connected to said gyroscope for precessing the same in the pitch plane of said support, a pendulum on said follow-up member responsive to deviation of said member from said position in the pitch plane of said support, operative connections between said pendulum and said motive means for inducing precession of said gyroscope in the pitch plane of said support to cause said follow-up mechanism to restore said follow-up member to said predetermined position, and means interposed in said connections for modifying the induced precession of said gyroscope by said motive means in accordance with a shift in the position of the center of gravity of said gyroscope.

10. A leveling apparatus adapted to be mounted on an unstable support, the combination of a gyroscope universally mounted on said support, a follow-up member therefor having a predetermined position in space, follow-up mechanism responsive to relative movement between said gyroscope and said support for actuating said follow-up member to follow said gyroscope, motive means operatively connected to said gyroscope for precessing the same in the respective roll and pitch planes of said support, a pair of pendulums pivoted in the roll and pitch planes of said support on said follow-up member responsive to deviation of said member from said position in said respective roll and pitch planes, operative connections between said pendulums and said corresponding motive means for inducing precession of said gyroscope in the corresponding plane to cause said follow-up mechanism to restore said follow-up member to said predetermined position, and means interposed in said connections for modifying the induced precession of said gyroscope by said motive means in accordance with a shift in the position of the center of gravity of said gyroscope in said respective planes.

11. A leveling apparatus adapted to be mounted on an unstable support, the combination of a gyroscope universally mounted on said support, a follow-up member therefor having a predetermined position in space, electrical motive means operatively connected to said gyroscope for precessing the same, a pendulum pivoted about a horizontal axis on said follow-up member responsive to deviation of said member from said position, a transformer winding rotatable by said pendulum about said pendulum axis, an inductively coupled transformer winding on said follow-up member, operative connections between said pendulum winding and said motive means for inducing precession of said gyroscope to restore said follow-up member to said predetermined position, and means interposed in said connections for modifying the induced precession of said gyroscope by said motive means in accordance with a shift in the position of the center of gravity of said gyroscope.

12. A leveling apparatus adapted to be mounted on an unstable support, the combination of a gyroscope, a universal mount therefor fixedly oriented on said support, a follow-up member for said gyroscope having a predetermined position in space, motive means operatively connected to said gyroscope for precessing the same, a pendulum on said follow-up member responsive to deviation of said member from said position, operative connections between said pendulum and said motive means for inducing precession of said gyroscope to restore said follow-up member to said predetermined position, and means interposed in said connections for modifying the operation of said motive means in accordance with a shift in the center of gravity of said gyroscope.

13. A leveling apparatus adapted to be mounted on an unstable support, the combination of a gyroscope, a universal mount therefor fixedly oriented on said support, a follow-up member for said gyroscope having a predetermined position in space, motive means operatively connected to said gyroscope for precessing the same, a pendulum on said follow-up member responsive to deviation of said member from said position, operative connections between said pendulum and said motive means for inducing precession of said gyroscope to restore said follow-up member to said predetermined position, and means responsive to a shift in the center of gravity of said gyroscope interposed on said connections for modifying the operation of said motive means accordingly.

14. A leveling apparatus adapted to be mounted on an untable support, the combination of a gyroscope, a universal mount therefor fixedly oriented on said support, a follow-up member for said gyroscope having a predetermined position in space, motive means operatively connected to said gyroscope for precessing the same, a pendulum on said follow-up member responsive to deviation of said member from said position, operative connections between said pendulum and said motive means for inducing precession of said gyroscope to restore said follow-up member to said predetermined position, and means responsive to a shift in the center of gravity of said gyroscope interposed in said connections for modifying the operation of said motive means accordingly.

15. A leveling apparatus adapted to be mounted on an unstable support, the combination of a gyroscope, a universal mount therefor fixedly oriented on said support, a follow-up member for said gyroscope having a predetermined position in space, motive means operatively connected to said gyroscope for precessing the same, a pendulum on said follow-up member responsive to deviation of said member from said position, operative connections between said pendulum and said motive means for inducing precession of said gyroscope to restore said follow-up member to said predetermined position, and means responsive to a shift in the center of gravity of said gyroscope relatively to the mounting thereof and interposed in said connections for modifying the operation of said motive means accordingly.

16. A leveling apparatus adapted to be mounted on an unstable support, the combination of a gyroscope universally mounted on said support, a follow-up member therefor having a predetermined position in space, electrical motive means operatively connected to said gyroscope for precessing the same, a pendulum pivoted about a horizontal axis on said follow-up member responsive to deviation of said member from said position, a transformer winding rotatable by said pendulum about said pendulum axis, an inductively coupled transformer winding on said follow-up member, operative connections between said pendulum winding and said motive means for inducing precession of said gyroscope to restore said follow-up member to said predetermined position, and means interposed in said connections for modifying the voltage output of said pendulum winding in accordance with a shift in the center of gravity of said gyroscope for correcting the operation of said motive means accordingly.

17. A leveling apparatus adapted to be mounted on an unstable support, the combination of a gyroscope universally mounted on said support, a follow-up member therefor having a predetermined position in space, electrical motive means operatively connected to said gyroscope for precessing the same, a pendulum pivoted about a horizontal axis on said follow-up member responsive to deviation of said member from said position, a transformer winding rotatable by said pendulum about said pendulum axis, an inductively coupled transformer winding on said follow-up member, operative connections between said pendulum winding and said motive means for inducing precession of said gyroscope to restore said follow-up member to said predetermined position, and means responsive to a shift in the center of gravity of said gyroscope interposed in said connections for modifying the voltage output of said pendulum winding for correcting the operation of said motive means accordingly.

18. A leveling apparatus adapted to be mounted on an unstable support, the combination of a gyroscope universally mounted on said support, a follow-up member therefor having a predetermined position in space, electrical motive means operatively connected to said gyroscope for precessing the same, a pendulum pivoted about a horizontal axis on said follow-up member responsive to deviation of said member from said position, a transformer winding rotatable by said pendulum about said pendulum axis, an inductively coupled transformer winding on said follow-up member, operative connections between said pendulum winding and said motive means for inducing precession of said gyroscope to restore said follow-up member to said predetermined position, and means responsive to a shift in the center of gravity of said gyroscope interposed in said connections for modifying the voltage output of said pendulum winding for correcting the operation of said motive means accordingly.

19. A leveling apparatus adapted to be mounted on an unstable support, the combination of a gyroscope universally mounted on said support, a follow-up member therefor having a predetermined position in space, electrical motive means operatively connected to said gyroscope for precessing the same, a pendulum pivoted about a horizontal axis on said follow-up member responsive to deviation of said member from said position, a transformer winding rotatable by said pendulum about said pendulum axis, an inductively coupled transformer winding on said follow-up member, operative connections between said pendulum winding and said motive means for inducing precession of said gyroscope to restore said follow-up member to said predetermined position, and means responsive to a shift in center of gravity of said gyroscope relatively to the mounting thereof interposed in said connections for modifying the voltage output of said pendulum winding for correcting the operation of said motive means accordingly.

20. In leveling apparatus mounted on an unstable support, the combination of a vertical spin axis gyroscope, a gimbal suspension therefor having independent axes in coordinate vertical planes, electrical motive means carried by said suspension for creating precessing torques about said coordinate axes, a follow-up member in said gimbal suspension having a predetermined position in space, follow-up mechanism responsive to relative movement of said gyroscope about said axes for actuating said follow-up member to follow said gyroscope, a pair of pendulums suspended from said follow-up member about horizontal pivots in said coordinate vertical planes, respective transformers having their windings carried by said follow-up member and said pendulum pivots and inductively coupled for generating voltages proportional to a trigonometric function of the angle of displacement of each corresponding pendulum out of its said vertical plane, electrical connections between each of said pendulum transformers and the corresponding motive means for energizing the latter to create a torque about the corresponding gimbal axis, whereby said gyroscope precesses in the plane of suspension of the corresponding pendulum to thereby cause said follow-up mechanism to restore said follow-up member to said predetermined position in space, and means interposed in said connections for modifying the induced precission of said gyroscope by said motive means in accordance with a shift in the position of the center of gravity of said gyroscope in the corresponding co-ordinate vertical planes.

References Cited in the file of this patent

UNITED STATES PATENTS

| | | |
|---|---|---|
| 2,093,503 | Wittkuhns et al. | Sept. 21, 1937 |
| 2,411,087 | Ford et al. | Nov. 12, 1946 |